(12) United States Patent
Benusovich et al.

(10) Patent No.: US 12,489,772 B2
(45) Date of Patent: Dec. 2, 2025

(54) DETECTING FRAUDULENT USER FLOWS

(71) Applicant: International Business Machines Corporation, Armonk, NY (US)

(72) Inventors: Shimon Benusovich, Rishon le Zion (IL); Andrey Finkelshtein, Beer Sheva (IL); Noga Agmon, Givat Shmuel (IL)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 18/210,252

(22) Filed: Jun. 15, 2023

(65) Prior Publication Data
US 2024/0422183 A1    Dec. 19, 2024

(51) Int. Cl.
H04L 9/40    (2022.01)
G06F 16/906    (2019.01)

(52) U.S. Cl.
CPC ........ H04L 63/1425 (2013.01); G06F 16/906 (2019.01)

(58) Field of Classification Search
None
See application file for complete search history.

(56) References Cited

U.S. PATENT DOCUMENTS

| | | | |
|---|---|---|---|
| 8,880,441 B1 | 11/2014 | Chen et al. | |
| 2014/0310159 A1* | 10/2014 | Zoldi | G06Q 20/4016 705/39 |
| 2017/0154640 A1* | 6/2017 | Wang | G10L 17/04 |
| 2020/0053093 A1 | 2/2020 | Goodsitt et al. | |
| 2021/0097546 A1 | 4/2021 | Adjaoute et al. | |
| 2021/0397669 A1 | 12/2021 | Finkelshtein et al. | |
| 2022/0321581 A1* | 10/2022 | Sood | H04L 67/133 |
| 2023/0035639 A1* | 2/2023 | Zhao | G06F 16/3347 |
| 2023/0046392 A1* | 2/2023 | Gomez | G06N 20/20 |
| 2024/0070230 A1* | 2/2024 | Bui | G06Q 30/0185 |

FOREIGN PATENT DOCUMENTS

WO    WO2019015499 A1    1/2019

OTHER PUBLICATIONS

International Search Report and Written Opinion dated Jun. 7, 2024 for International Application No. PCT/IB2024/053220, 8 pages.

(Continued)

*Primary Examiner* — Raqiul A Choudhury
(74) *Attorney, Agent, or Firm* — CANTOR COLBURN LLP; Anthony Pallone

(57) ABSTRACT

Mechanisms are provided for detecting fraudulent user flows associated with a website. User flow data, representing an interaction by a user with content of a website, is received and converted to a vector representation that represents a time series transition from one portion of website content to another of the website. The vector representation is input to a trained sequential machine learning computer model which generates a classification of the vector representation. A determination as to whether or not the user flow data represents a fraudulent user flow is made based on the classification. An output is generated that indicates whether or not the user flow is a fraudulent user flow based on the detection.

18 Claims, 5 Drawing Sheets

(56) References Cited

OTHER PUBLICATIONS

Dadfarnia, Mahila et al., "Incremental collusive fraud detection in large-scale online auction networks", The Journal of Supercomputing, https://doi.org/10.1007/s11227-020-03170-9, Jan. 2020, 22 Pages.
Cao, Shaosheng et al., "TitAnt: Online Realtime Transaction Fraud Detection in Ant Financial", arXiv: 1906.07407v1 [cs.LG] Jun. 18, 2019, 12 pages.
Esakkiraj, S. et al., "A Predictive Approach for Fraud Detection Using Hidden Markov Model", International Journal of Engineering Research & Technology (IJERT), vol. 2 Issue 1, Jan. 2013, 7 pages.
Kawazu, Hirotaka et al., "Analytical method of web user behavior Using Hidden Markov Model", 2016 IEEE International Conference on Big Data (Big Data). IEEE, Dec. 2016, 7 pages.
Kim, Junghee et al., "Sequential Pattern Mining Approach for Personalized Fraudulent Transaction Detection in Online Banking", Sustainability, MDPI, vol. 14(15), pp. 1-18, Aug. 2022.
Marar, Dr.Sudheer S. et al., "Detection of credit card fraud using query based algorithm", International Journal of Creative Research Thoughts, vol. 10, Issue 5 May 2022, 9 pages.
Mhamane, Sunil S. et al., "Use of Hidden Markov Model as Internet Banking Fraud Detection", International Journal of Computer Applications (0975-8887) vol. 45—No. 21, May 2012, 6 pages.
Mhatre, Gaurav et al., "Credit Card Fraud Detection Using Hidden Markov Model", International Journal of Computer Science and Information Technologies, vol. 5 (2), Sep. 2014, 3 pages.
Patel, Niki, "Online Transaction Fraud Detection Using Hidden Markov Model and Behavior Analysis", California State University San Marcos, Department of Computer Science and Information System, Apr. 12, 2021, 40 pages.
Wang, Xiaoguo et al., "Research on Bank Anti-fraud Model Based on K-means and Hidden Markov Model", 2018 3rd IEEE International Conference on Image, Vision and Computing, Jun. 2018, 5 pages.
Wei, Wei et al., "Effective detection of sophisticated online banking fraud on extremely imbalanced data", https://link.springer.com/article/10.1007/s11280-012-0178-0, Jul. 12, 2012, 27 pages.

\* cited by examiner

DETECTING FRAUDULENT USER FLOWS

BACKGROUND

The present application relates generally to an improved data processing apparatus and method and more specifically to an improved computing tool and improved computing tool operations/functionality for detecting fraudulent user flows with regard to user activities on websites.

The financial world suffers from frequent frauds involving the use of deceptive, misleading, or false business practices. This causes tremendous damage not only to individuals but to organizations as well. This is especially true for organizations that provide a level of insulation or protection for their own customers from such frauds, such as credit card companies and the like, which have to deal with situations where their customers are defrauded, and the organization covers the customer's losses while trying to recoup the fraudulently obtained funds. However, these are not the only types of losses incurred in the financial sector due to fraud, as other losses may include less quantifiable or indirect costs, such as personnel time, good will, and the like.

Organizations are trying to defend themselves by identifying fraudulent actions and stop them before they cause irreversible damage. One of the most common fraud use-cases is the Account Takeover (ATO), where a fraudster gains unauthorized access to takeover an online account. Fraudsters can change account details, make purchases, withdraw funds, and gain sensitive and confidential data. Online accounts can be accounts associated with banks, credit-cards, online-shopping websites, or any other online entity and activities. In some cases, the ATO fraud may not even be concerned with monetary theft from the account owner, but may be simply to access sensitive/confidential data for other gains. Identifying (and stopping) ongoing ATO frauds before they succeed and damage is done, is among the highest priorities for organizations, however existing mechanisms do not adequately take into consideration the sequential flow of interactions with the online content when attempting to detect such frauds.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for detecting fraudulent user flows associated with a website. The method comprises receiving user flow data representing an interaction by a user with content of a website, and converting the user flow data to a vector representation. The vector representation represents a time series transition from one portion of website content to another of the website. The method also comprises inputting the vector representation to at least one trained sequential machine learning computer model which processes the vector representation and generates a classification of the vector representation. In addition, the method comprises detecting whether or not the user flow data represents a fraudulent user flow based on the classification, and outputting an output that indicates whether or not the user flow is a fraudulent user flow based on the detection. Thus, the illustrative embodiments are able to automatically detect whether a user flow, which may be part of a current user session or a previous user session, is representative of fraudulent activity or is legitimate access to the website.

In some illustrative embodiments, the user flow data comprises one or more entries, each entry comprises a timestamp and a corresponding identifier of corresponding content of the website, and the timestamp specifies a time when a user accesses the corresponding content of the website. In some illustrative embodiments, the corresponding content of the website is a webpage of the website, and the corresponding identifier is a Uniform Resource Locator (URL) of the corresponding content of the website.

In some illustrative embodiments, converting the user flow data to a vector representation comprises sorting entries in the user flow data according to timestamp associated with the entries and clustering the entries into a plurality of clusters based on a cluster mapping of identifiers of corresponding content of the website associated with the entries, where each cluster in the plurality of clusters has a corresponding cluster identifier. In addition, the converting may comprise generating the vector representation as a vector of cluster identifiers arranged in time series order according to results of the sorting. In some illustrative embodiments, the clustering of the entries comprises clustering uniform resource locator (URL) fragments into the clusters, where the vector representation comprises a sequential time series of cluster identifiers corresponding to the user flow data. Thus, the illustrative embodiments are able to evaluate sequences of activities, such as a time series of transitions between webpages of a website, when determining whether an access of a website is potentially part of a fraudulent activity or not.

In some illustrative embodiments, the at least one trained sequential machine learning computer model comprises a sequential machine learning computer model that is trained to classify the vector representation as to whether or not the vector representation represents a user flow that is indicative of a fraud being committed by a fraudulent user flow. In some illustrative embodiments, the fraud is an Account Takeover (ATO) fraud. Thus, the illustrative embodiments are able to classify user flows with regard to specific types of fraud, such as the ATO fraud, before substantial damage occurs.

In some illustrative embodiments, the at least one trained sequential machine learning computer model comprises at least one Hidden Markov Model (HMM) computer model and wherein the vector representation is a Markov chain.

In some illustrative embodiments, the at least one trained sequential machine learning computer model comprises a first sequential machine learning computer model trained to classify the vector representation as to whether or not the vector representation represents a user flow that is indicative of a fraud being committed by a fraudulent user flow, and a second sequential machine learning computer model trained to classify the vector representation as to whether or not the vector representation represents a user flow that is indicative of a legitimate user flow. In some illustrative embodiments, the first sequential machine learning computer model generates a first score, and the second sequential machine learning computer model generates a second score. In some illustrative embodiments, detecting whether or not the user flow data represents a fraudulent user flow based on the classification comprises comparing the first score relative to the second score and based on results of the comparison, detecting whether the user flow data represents a fraudulent user flow. In this way, the competing interests of the two trained models may be used to improve the classification generated by the system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
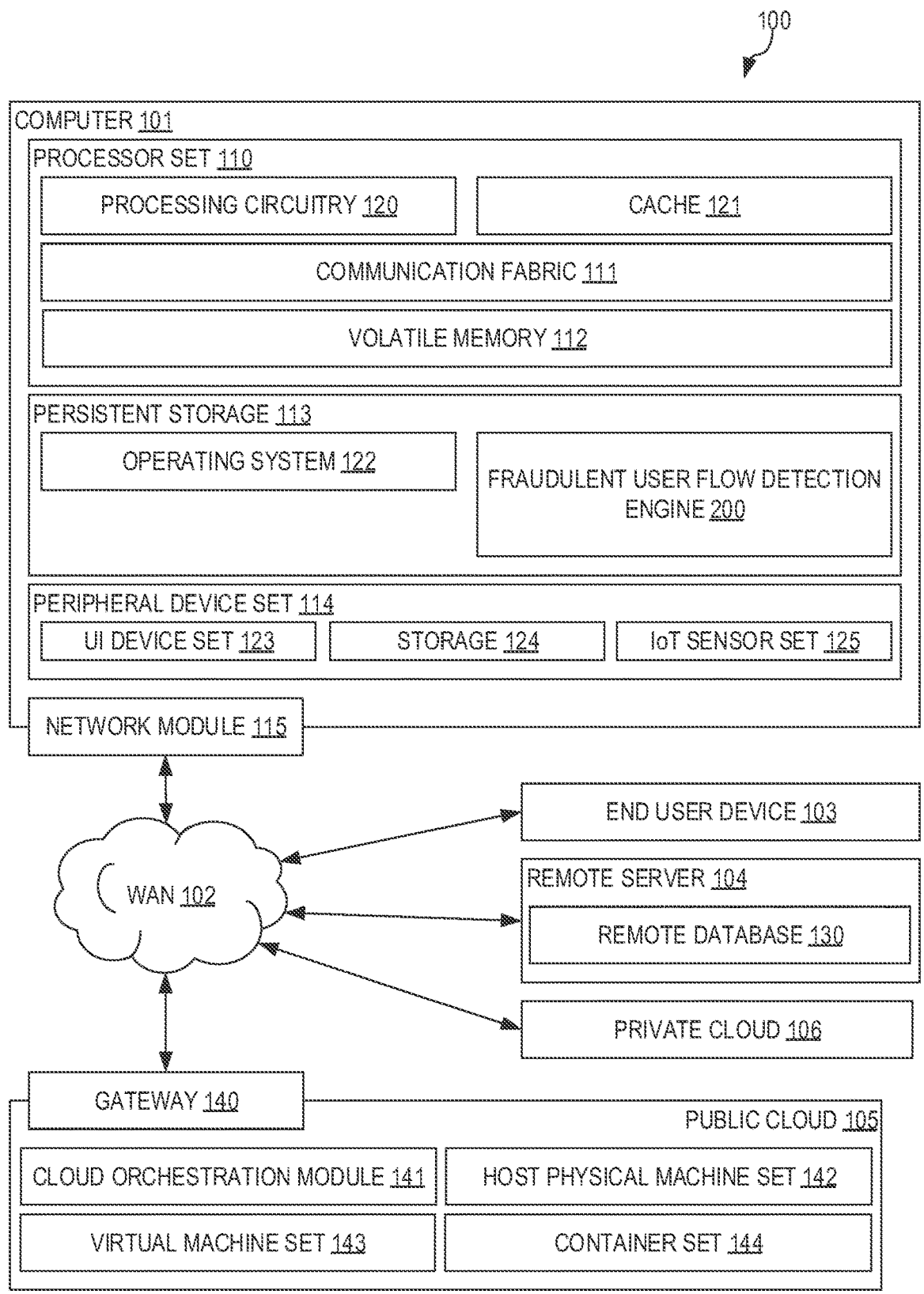
FIG. 1 is an example diagram of a distributed data processing system environment in which aspects of the illustrative embodiments may be implemented and at least some of the computer code involved in performing the inventive methods may be executed.

As noted above, identifying (and stopping) ongoing Account Takeover (ATO) frauds before they succeed and damage is done is a significant issue for modern organizations, especially organizations involved in electronic commerce via one or more data networks. To facilitate such identification and halting of ATO frauds, organizations apply different fraud-detection technologies, some of which collect various data types, such as mouse-movement information, device usage information, location information, and more, from the computing devices used to access the accounts. However, these mechanisms operate on a single instance in time, or a snapshot of data. While such mechanisms can be useful in detecting frauds, because they do not take into account sequences of activities that together may be part of an ATO fraud, they may not identify all ATO frauds. That is, as attackers become more sophisticated, they often utilize activities, that on their own, or in a single snapshot, may seem benign, but when combined with other activities, are part of a pattern of interactions that result in an ATO fraud. Moreover, the attackers can use sophisticated bots and malware to create automatic accelerated user flow activity or use remote access tools for social engineering to guide the victim flow during an online session and thus, the victim's flow will not appear to be fraudulent on its own. The current fraud detection technologies work well in some cases but there are still cases in which it is difficult to determine whether a fraud is occurring or not.

The mechanisms of the illustrative embodiments focus on analyzing data representing user activities, or the way that users traverse an online website, which may be comprised of multiple web pages, various content, various hyperlinks to the web pages, may be organized with various hierarchies, and the like. The data representing the chain of activities a user engages in to traverse the website is referred to herein as "user-flow". For purposes of the description of the illustrative embodiments, it will be assumed that the website being traversed is a financial website, where a "financial" website is any website having a user account for the purpose accessing monetary funds or otherwise engaging in financial transactions electronically. It should be appreciated that while a "financial website" will be used herein as an example, the illustrative embodiments are not limited to such, and the mechanisms of the illustrative embodiments may be similarly applied to any online website, regardless of domain, where an ATO fraud may occur.

The user flow data, representing the user's activities in traversing a website, is constructed from the journey the user goes through when interacting with the website. For example, the following sequence, or path, of user activities can be the basis for the construction of a user flow: (1) the user begins at the login webpage and (2) continues to the account settings webpage, with the user then (3) continuing to the account balance webpage, and finally (4) visiting the money transfer webpage before (5) logging off. Such a sequence of activities, e.g., user inputs to the various web pages to navigate the website, may be monitored and tracked/logged so as to build a record of the user's interaction with the website.

The illustrative embodiments take such user flow data and represents the user flow as a sequential series of webpage transitions. The illustrative embodiments then apply a machine learning computer model, such as a Hidden Markov Model (HMM), a recurrent neural network (RNN), long short term memory (LSTM) networks, gated recurrent unit (GRU), sequence-to-sequence neural network, conditional random fields (CRF), Bayesian networks, or the like to classify the sequential series of webpage transitions, i.e., the user interaction with the website, as fraudulent or legitimate. In order to achieve this operation, the illustrative embodiments generate the user flow data from the tracked user interactions with the web pages of the website, and then convert the user flow data into webpage clusters, e.g., Uniform Resource Locator (URL) clusters or the like. The illustrative embodiments create sequential data, e.g., Markov chains in embodiments using an HMM as the machine learning computer model, from the user flow data of website interactions, and train the machine learning computer model, e.g., the Hidden Markov Model (HMM), to classify the user flow data as fraudulent or legitimate. This classification may be a binary classification, or may be based on a probability determination and thus, be on a spectrum of values from 0.0 to 1.0, where one extreme is considered clearly fraudulent and the other extreme of the spectrum is considered clearly legitimate. The classification may be with regard to a particular type of fraud that may be committed against a website, such as an Account Takeover (ATO) fraud. It should be appreciated that different computer models may be trained to detect user flow data representative of different types of frauds, such as social engineering frauds, malware frauds, bot based frauds, etc. In some illustrative embodiments, a single computer model may be configured to return probabilities, or scores, of the likelihood of the user flow sequent to be fraudulent in general or legitimate in general, or different probabilities/scores for different types of frauds.

Thus, with the mechanisms of the illustrative embodiments, the sequence of activities engaged in by a user when interacting with a website may be represented as sequenced dataset, e.g., a Markov chain or other sequential dataset, and this sequence may be classified with regard to whether it is representative of a fraudulent or legitimate interaction with a website. In this way, interactions which individually appear to be legitimate, but when considered as a whole may be part of a more complex fraud attempt, may be identified automatically using trained machine learning computer models and thereby detect such frauds, and prevent such frauds, prior to significant lasting damage, from a financial loss perspective or other less quantifiable loss perspective, e.g., loss of good will or reputation, loss in terms of workforce utilization, and the like.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a fraudulent user flow detection engine that operates to evaluate user flow data, representing a sequence of user interactions with webpages of a website, with regard to whether they are fraudulent or not, and specifically whether they are indicative of an Account Takeover (ATO) fraud. The improved computing tool implements mechanism and functionality, such as the fraudulent user flow detection engine, which cannot be practically performed by human beings either outside of, or with the assistance of, a technical environment, such as a mental process or the like. The improved computing tool provides a practical application of the methodology at least in that the improved computing tool is able to track and generate user flow data representing the user's interaction with a website over multiple webpages, and classify that user flow data as to whether it is representative of a fraudulent interaction with the website or a legitimate interaction with the website, such as in the case of an Account Takeover (ATO) fraud.

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as the fraudulent user flow detection engine 200. In addition to fraudulent user flow detection engine 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and fraudulent user flow detection engine 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in fraudulent user flow detection engine 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in fraudulent user flow detection engine 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As shown in FIG. 1, one or more of the computing devices, e.g., computer 101 or remote server 104, may be specifically configured to implement a fraudulent user flow detection engine 200. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates fraudulent user flow detection and prevention of frauds, such as Account Takeover (ATO) frauds or the like, causing significant damage to organizations by focusing efforts on such detected frauds to prevent their continued use or spread.

As discussed above, the illustrative embodiments provide mechanisms to detect fraudulent user interactions, or sessions, with a website, such as a financial website. In accordance with some illustrative embodiments, the illustrative embodiments utilize user flow data, e.g., user interacts with webpages of a website to traverse the webpages of the website, by representing the user flow data as a sequential dataset, such as a Markov chain, that is used for training a supervised Hidden Markov Model (HMM) classifier to detect fraudulent user interactions, or financial sessions in the case of a financial website, by classifying the sequential dataset as fraudulent or legitimate. It should be appreciated that while the illustrative embodiments will be described with regard to a HMM classifier and the sequential user flow data being a Markov chain, the illustrative embodiments are not limited to such. To the contrary, any suitable machine learning computer model that may be trained and operate on sequential datasets to classify those sequential datasets with regard to fraudulent and/or legitimate patterns of activity, may be used without departing from the spirit and scope of the present invention.

The mechanisms of the illustrative embodiments operate under two primary stages of operation, a training stage, and a classification stage. During the training stage of operation, the machine learning computer model is trained on training user flow data, which is labeled as legitimate or fraudulent, through a machine learning process to learn to classify patterns of features in the training user flow data with regard to legitimate or fraudulent activities. This machine learning process may involve multiple different user flow data and may involve multiple iterations or epochs, using one or more loss functions to measure the error between the machine learning model's classification and the labeled classification (or ground truth). Machine learning algorithms, such as a linear regression or the like, may be used to adjust operational parameters, e.g., weights of nodes in the machine learning computer model, to minimize the loss, or error, until the loss is below a predetermined acceptable threshold level, or a predetermined number of epochs of machine learning training have occurred. As will be discussed in greater detail hereafter, the illustrative embodiments utilize a specific time series of data and clustering of the time series of data to perform this training of the machine learning model, e.g., Hidden Markov Model (HMM).

In some illustrative embodiments, as discussed hereafter, two machine learning models may be trained, one for detecting fraudulent user flow data and one for detecting legitimate user flow data. Each machine learning model may separately generate a score or confidence that the user flow data is either fraudulent (for the first machine learning model) or legitimate (for the second machine learning model), and the scores of confidence may be compared to determine a final classification of legitimate or fraudulent for the user flow data. For example, if a first machine learning model determines that the user flow is fraudulent or if the second machine learning model determines that the user flow is not legitimate, then the user flow may be flagged as fraudulent. As another example, the absolute difference value between the scores of the first and second machine learning models may be evaluated and compared to a threshold. If the difference is equal to or greater than the threshold, then the higher score's finding is adopted, e.g., if a first score is 0.64 and the second score is 0.43, then the absolute difference is 0.21. If the threshold is 0.10, then the difference is greater than the threshold and the higher score's finding is adopted, e.g., "fraudulent" in this case.

In some illustrative embodiments, rather than using two machine learning models, just the machine learning model for evaluating fraudulent user flows may be utilized. In these illustrative embodiments, the fraudulent user flow detection machine learning model, or simply fraudulent model, may provide a binary output of either fraudulent or not fraudulent.

Once the machine learning model(s) have been trained during the training stage of operation, the trained machine learning model(s) may be used during a classification stage to classify new user flow data as to whether or not the user flow data is representative of a legitimate or fraudulent interaction with the website. That is, during, or shortly thereafter, a user's session with a website, the user flow data for that user session may be converted to a sequential dataset, e.g., Markov chain, and the trained machine learning model(s), e.g., HMM, may be executed on the user flow data to classify the user flow data with regard to whether it is legitimate or fraudulent. It should be appreciated that in some illustrative embodiments, this user flow data may be built up over time and the machine learning models may be executed repeatedly on the user flow data as it changes over time to make multiple classifications. If any of the classifications indicate a fraudulent user flow, then the session may be terminated or otherwise logged/reported as fraudulent. Thus, at a first time point, a user flow may have activities A, B, and C, and may be considered legitimate, but then at a later time during the same user session, additional activities D, E, and F may be logged with the machine learning model(s) generating a classification of fraudulent and the user session may be terminated, logged, or otherwise reported for appropriate security precautions.

Thus, the illustrative embodiments provide mechanisms for classification of a user flow of a user session, such as a financial session, to determine whether the user flow is indicative of a fraudulent interaction with a website. The illustrative embodiments represent the user flow data as a sequential dataset, such as a Markov chain, and applies a sequential machine learning model, such as an HMM, to the user flow data to classify the user flow data as to whether it is fraudulent or legitimate. Based on this classification, a user's session may be terminated, logged, or otherwise reported for future security operations.

Figure 2:
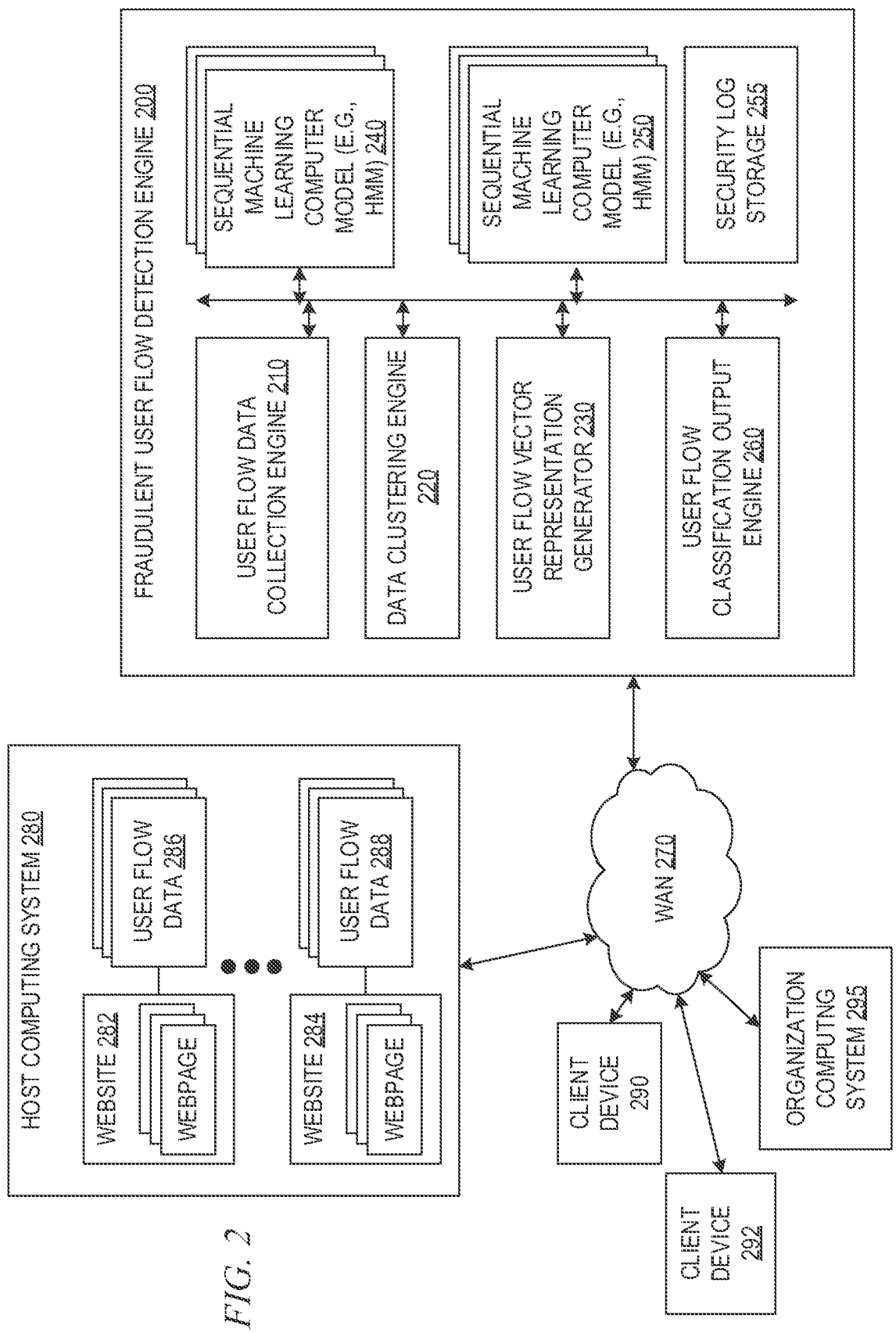
FIG. 2 is an example diagram illustrating the primary operational components of a fraudulent user flow detection engine in accordance with one illustrative embodiment.

FIG. 2 is an example diagram illustrating the primary operational components of a fraudulent user flow detection engine in accordance with one illustrative embodiment. The operational components shown in FIG. 2 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., user inputs for traversing a website, and the resulting output may aid human beings, e.g., reporting fraudulent user flows that may be indicative of a fraud attack on the website, e.g., an Account Takeover (ATO) or the like. The invention is specifically directed to the automatically operating computer components directed to improving the way that fraudulent user flows are detected based on an evaluation of the actual sequential interactions of the user with the elements of the website, and providing a specific solution that implements user flow data, clustering of user flow data, and training of sequential machine learning computer models to classify user flow data with regard to the user flow data being indicative of a fraudulent user flow or legitimate fraudulent user flow, which cannot be practically performed by human beings as a mental process and is not directed to organizing any human activity.

As shown in FIG. 2, the primary operational components of a fraudulent user flow detection engine 200 include a user flow data collection engine 210, a data clustering engine 220, a user flow vector representation generator 230, a first sequential machine learning computer model 240 for classifying user flow vector representations as to whether they are legitimate or not (legitimate model), a second sequential machine learning computer model 250 for classifying user flow vector representations as to whether they are fraudulent or not (fraud model), and a user flow classification output engine 260. It should be appreciated that while the depicted embodiment shows two sequential machine learning computer models 240, 250 the illustrative embodiments do not require two sequential machine learning computer models 240, 250. In some illustrative embodiments, a single sequential machine learning computer model, e.g., fraud model 250, may be utilized with its classification being used as a final classification for the user flows.

It should also be appreciated that there may be a separate set of one or more sequential machine learning computer models for each possible fraud that is to be detected. Thus, for example, the depicted models 240, 250, which are considered for this example to be HMMs, are specifically trained on training user flow data to identify instances of sequences of user interactions that are indicative of an ATO fraud. Other sets of models (not shown) may also be trained for other types of frauds to thereby detect user flows that are indicative of these other frauds. Moreover, it should be appreciated that these models 240, 250 may be generally applicable to multiple websites, or may be specifically trained for a particular website. In the latter case, there may be different sets of models 240, 250 for each website, and the fraudulent user flow detection engine 200 may execute the different sets of models 240, 250 on user flows based on which website the user flow corresponds to.

The user flow data collection engine 210 comprises logic, application programming interfaces (APIs), network interfaces, and the like, for communicating with user flow data source computing systems 280 via one or more data networks 270 to obtain user flow data from these source computing systems 280. For example, the source computing systems 280 may comprise computing systems hosting websites 282, 284 of interest. That is, an organization, such as a financial organization, e.g., bank, credit card company, online shopping entity, or the like, may host their website on one or more host computing systems 280 and conduct electronic interactions with users (customers) via one or more data networks, such as WAN 270, and one or more computing devices, e.g., clients 290, 292 and other organization computing systems 295. The organizations may further enlist the services of the fraudulent user flow detection engine 200 to detect fraudulent user flows, e.g., user flow data 286, 288 associated with one or more websites 282, 284. In some illustrative embodiments, the fraudulent user flow detection engine 200, while shown as a separate entity in FIG. 2, e.g., a cloud service provided by a cloud service provider computing system, may in fact be integrated into the organization's own computing systems, or the host computing system 280, for use with their own websites.

The user flow data collection engine 210 collects data from the computing system hosting the website with regard to tracked user interactions with the website. In the example illustrative embodiments, these tracked user interactions comprise interactions for traversing from one webpage to another within the website, as well as timing information indicating timestamps of such interactions and/or timing information regarding how long a user interacted with, viewed, or otherwise appears to have been using a webpage of the website, e.g., how long the user lingered on a particular webpage. While this user interaction data will be used as examples herein, it should be appreciated that in other illustrative embodiments, other user interaction information may also be tracked and reported, such as user selection of links, mouse-over information, or the like.

In determining the traversal from one webpage to another, URLs and/or URL fragment information may be captured along with timestamp information, for example. During training of the one or more sequential machine learning computer models 240, 250, this data comprises data from multiple user flows, each related to one session where a user interacted with the website, and which is labeled as legitimate or fraudulent. An example of the data collected during such a session may be of the type {(created_at(timestamp), URL, time on page)}, for example. While traversing from one page to another, the URL identifies the current page. The "created at" is the timestamp of the time when the user landed in the URL. The "time on page" value is optional but if provided measures the amount of time the user spent on the webpage prior to traversing to the next webpage or terminating the session.

Instances of these data collected over the same user session indicate a sequence or user flow for that session. An example of a possible financial session user-flow data may be of the type:

[{'created_at': 1645368225,'url':'https://particulares.bancosantander.es/login/'},{'created_at': 1645368283,'url': 'https://particulares.bancosantander.es/nhb/#/posicion-global'},{'created_at': 1645368290,'url': 'https://particulares.bancosantander.es/nhb/#/cuentas/detalle'}]

The user flow data such as described above, is converted to a time series dataset, such as a Markov chain for processing by the sequential machine learning computer models 240, 250. In particular, the user flow vector representation generator 230 operates on the user flow data, employing the data clustering engine 220 to perform clustering on the URL fragments of the collected user flow data. A URL fragment is an internal webpage reference, sometimes called a named anchor, comprising a string of characters that refers to a resource that is subordinate to another, primary resource. The primary resource is identified by a Uniform Resource Identifier (URI), and the fragment points to the subordinate resource, and is often represented as a character string after the character "#" in the URL.

During a training operation, the training user flow data is used to generate URL fragment clusters by looking at each URL fragment, and for each unique URL fragment establishing a cluster identifier. Subsequent instances of the same URL fragment in the training user flow data may be associated with the same cluster identifier. This allows instances of URL fragments in user flow data to be replaced with a cluster identifier during the classification stage. Moreover, if a new URL fragment is encountered during the classification stage, a new cluster may be generated. Combinations of cluster identifiers in a user flow indicate the sequence of the user's traversal from one resource or sub resource, e.g., webpage, to another in the user flow. Thus, each user flow session is converted into a sequential list of URL cluster identifiers.

It should be appreciated that while the illustrative embodiments utilize the clustering of URL fragments as a mechanism for converting a user flow session's collected data into a sequential time series data structure, such as a Markov chain, the illustrative embodiments are not limited to clustering on URL fragments. To the contrary, any other element of the collected user flow data may be used to perform such clustering, as long as this clustering can result in a sequential list of cluster identifiers indicative of the user's traversal of the website during the user's session with the website. For example, in other clustering, the raw URL or scrubbed URL could be used as a basis for clustering.

A URL cluster mapper algorithm of the data clustering engine 220 operates to map each URL fragment I, where I=1 to n, to a corresponding cluster identifier J, where J=1 to m. Thus, the URL mapper maps f(url_i)=url_cluster_j. For example, assume that there is a URL list={url1, url2, url3, . . . , urln}. The URL cluster mapper is applied to this URL list to create a sequential list of URL Clusters where the clustered URLs:={url_cluster_1,url_cluster_1, . . . , url_cluster_6}. In this way, the cluster identifiers may be provided to the user flow vector representation generator 230 which sorts the URLs of the URL list for the user flow by timestamp and, due to the mapping to cluster identifiers, can thereby generate a vector representation of a time series of cluster identifiers corresponding to the URLs in the URL list for the user flow of the user session with the website.

For example, assume that the user flow data collection engine 210 collected a set of user flow data and the user flow vector representation generator 230 sorted this user flow data into the following example time sorted sequence in which a user visited 3 URLs of the website during their session:

{https://particulares.bancosantander.es/nhb/#/posicion-global',
'https://particulares.bancosantander.es/nhb/#/area-personal',
'https://particulares.bancosantander.es/nhb/#/tarjetas'}

Further, by applying the URL cluster mapper algorithm of the data clustering engine 220, these URLs, or URL fragments, are clustered as follows: {'/posicion-global': 1, '/cuentas/detalle': 2, . . . , '/area-personal': 6, '/tarjetas': 7 . . . }, where 1, 2, 6, and 7 are the cluster identifiers in this example. The resulting clusters list is thus, {url_cluster_1, url_cluster_6, . . . , url_cluster_7} or {1, 6, . . . , 7}. This cluster listing, sorted by timestamp, may represent the time series of activities of the user when interacting with the website, and may be considered a Markov chain which may be processed by a sequential machine learning computer model 240, 250, such as a Hidden Markov Model (HMM) 240, 250.

It should be appreciated that websites may contain high numbers of URLs with some of them being relevant and some of them not being relevant for fraud detection. By performing clustering using the clustering mapper, the data is being cleaned and the user flow Markov chains are more accurate in resembling the user behavior. Moreover, clustering the URLs, URL fragments, etc., makes the resulting computer model more robust to changes, e.g., adding, removing, or modifying web pages.

In some illustrative embodiments, the amount of time spent on each webpage may further be utilized to expand the time series representation of the vectors so as to reflect a pattern of temporal activity of the user on the webpages of the website. For example, the time series vector representations, or Markov chains, generated by the user flow vector representation generator 230 may be expanded by the time the user spent on each webpage, which as noted above, is an optional additional element of the user flow data that is collected from the user flow data source computing systems. In order to perform such an expansion, once the user flow vector representation generator 230 generates the time series vector representation, e.g., the Markov chain of URL clusters, the vector is expanded by multiplying each element by the time the user spent on each URL, normalized by a time interval. As a result, the vector will expand due the time spent on each URL such that there may be multiple sequential instances of the same cluster identifier in the vector representation, where the combined sequential instances is a representation of the amount of time the user spent during the user session on that webpage of the website.

For example, assume that the time interval is 5 and the URL list for the session, provided as part of the collected user flow data is {url1, url2, url3}. Assume that the amount of time on each of the webpages corresponding to these URLs is list(sec)={16, 4, 13} such that the normalized time on each webpage list is {3, 1, 2}. That is, dividing each of the time amounts by the time interval 5, one obtains the normalized time values shown. Based on these normalized time values, the corresponding URL list may be expanded as follows: {url1, url1, url1, url2, url3, url3}. This results in an expanded cluster identifier based vector representation, e.g., {url_cluster_1, url_cluster_1, url_cluster_1, url_cluster_6, url_cluster_7, url_cluster_7}. That is, the expansion of the vector representation can occur at the URL or the cluster ID level of vector representation generation by the generator 230.

The cluster vector representations generated by the user flow vector representation generator 230 are provided as input to the sequential machine learning computer models 240, 250, which hereafter will be considered to be HMMs for purposes of this description. The vector representations represent the user flow during a user session. During training of the HMMs 240, 250, these vector representations may be part of a larger set of training data and may be labeled as to whether the user flows are considered to be representative of a particular fraud or are representing a legitimate interaction with the website. In the depicted example one HMM 240 is trained to identify legitimate user flows based on input vector representations of cluster identifiers, and thus is referred to as the legitimate HMM 240. The other HMM 250 is trained to identify fraudulent user flows based on the input vector representations of cluster identifiers, and thus is referred to as the fraud HMM 250. Separate training datasets may be established for each of these HMMs 240, 250, e.g., a first training dataset comprising a set of legitimate labeled training data may be used by the legitimate HMM 240 to train it to recognize patterns in input vector representations indicative of legitimate user flows, while a second training dataset comprising a set of fraudulent labeled training data may be used by the fraud HMM 250 to train it to recognize patterns in input vector representations of fraudulent user flows. In some illustrative embodiments, the training data may comprise both legitimate labeled and fraudulent labeled training data and the HMMs 240, 250 may be trained on both types of training data to distinguish between legitimate and fraudulent user flows.

The HMMs 240, 250 may be trained using various machine learning algorithms, such as the backpropagation based machine learning algorithms or the like. The machine learning algorithms may utilize various loss, or error, functions to evaluate the accuracy of the classifications made by the HMMs 240, 250 during the machine learning training and backpropagate this loss or error so as to modify operational parameters of the HMMs 240, 250 in an effort to reduce this loss or error down to an acceptable level, as may be specified by a threshold loss. For example, weights of nodes contributing relatively more to the final outcome classification may be adjusted based on the determined loss or error.

Each HMM 240, 250 may be trained to output a classification label, or probability value, with regard to fraudulent or legitimate user flows, e.g., {0, 1} or {Fraud, Legitimate}. The HMMs 240, 250 may utilize the forward-backward algorithm with an observation matrix (clustered URL transition probabilities) and an observation probability matrix (the probability for observation to be generated from the state (Fraud/Legitimate).

For each user flow of a session, each HMM 240, 250 gives a score, which is the probability of the user flow being fraudulent or legitimate. In some illustrative embodiments, this score may be a binary 0 or 1 indicating fraudulent (not legitimate) or legitimate (not fraudulent). In some illustrative embodiments, this score is along a spectrum from 0.0 to 1.0 and is a probability value, i.e., a probability that the user flow is fraudulent or a probability value that the user flow is legitimate. In some illustrative embodiments, where multiple HMMs, e.g., HMM 240 and 250, are utilized, the HMM providing the higher score may be used as final classification of the user flow. In some illustrative embodiments, a threshold on a score difference between the multiple HMMs may be utilized, e.g., if the difference between the scores is equal to or greater than a given threshold value, since the HMMs 240 and 250 are classifying diametrically opposed classes, e.g., fraudulent versus legitimate, then the higher scoring HMM 240, 250 may be regarded as the final classification for the user flow.

In some illustrative embodiments, the HMMs 240, 250 can be tuned according to the needed use-case, e.g., by increasing true positives or reducing false positives, similar to tuning a machine-learning model by changing the threshold. By setting a threshold difference between the fraud HMM 250 and legitimate HMM 240 scores, the user flow classification output engine 260 that generates the final classification for the user flow based on the HMM classifications from the HMMs 240, 250 can be tuned. For example, to reduce false positives, the user flow classification output engine 260 may classify the user flow as fraudulent only if the difference between the legit and fraud scores is equal to or higher than the specific threshold. The same can be done to increase true positives, as the user flow classification output engine 260 will classify the user flow as legitimate only if the difference between the legitimate HMM 240 and fraud HMM 250 scores is equal to or higher than the threshold. The threshold value itself can be empirically determined or otherwise set according to the desired implementation.

The user flow classification output engine 260 may output the final classification for the user flow. This output may be logged or recorded in a security log storage 255, for later use in performing security operations, or may be utilized by the hosting system 280 of the website, to perform additional security processes. For example, in embodiments where the user flows are being analyzed and classified dynamically during user sessions, the hosting system 280 may utilize the final classification output by the engine 260 as a basis for determining whether to continue to permit the user to access the website. For example, if the user flow classification output engine 260 outputs a classification that the user flow is fraudulent, then the hosting system 280 may operate to block or otherwise discontinue the user's session with the website. In some illustrative embodiments, the output classification can be used as a risk score, potentially combined with other existing risk factors, in evaluating the risks of user flows. In some illustrative embodiments, the classification output may be used to perform other assessments or authentications, such as a one-time password (OTP) or Completely Automated Public Turing test to tell Computers and Humans Apart (Captcha) authentication, terminate a session, block a transaction, delay a confirmation of a transaction and pass the decision to a fraud analyst, or the like.

Thus, the illustrative embodiments train one or more sequential machine learning computer models to classify user flows as to whether they are fraudulent or legitimate. The illustrative embodiments may train such models for each type of fraud that needs to be identified in user flows. Moreover, the illustrative embodiments may train models for each website being monitored. The illustrative embodiments are then able to classify newly received user flows to determine whether they are fraudulent or legitimate and then invoke appropriate security measures if the user flow is determined to be fraudulent.

Figure 3:
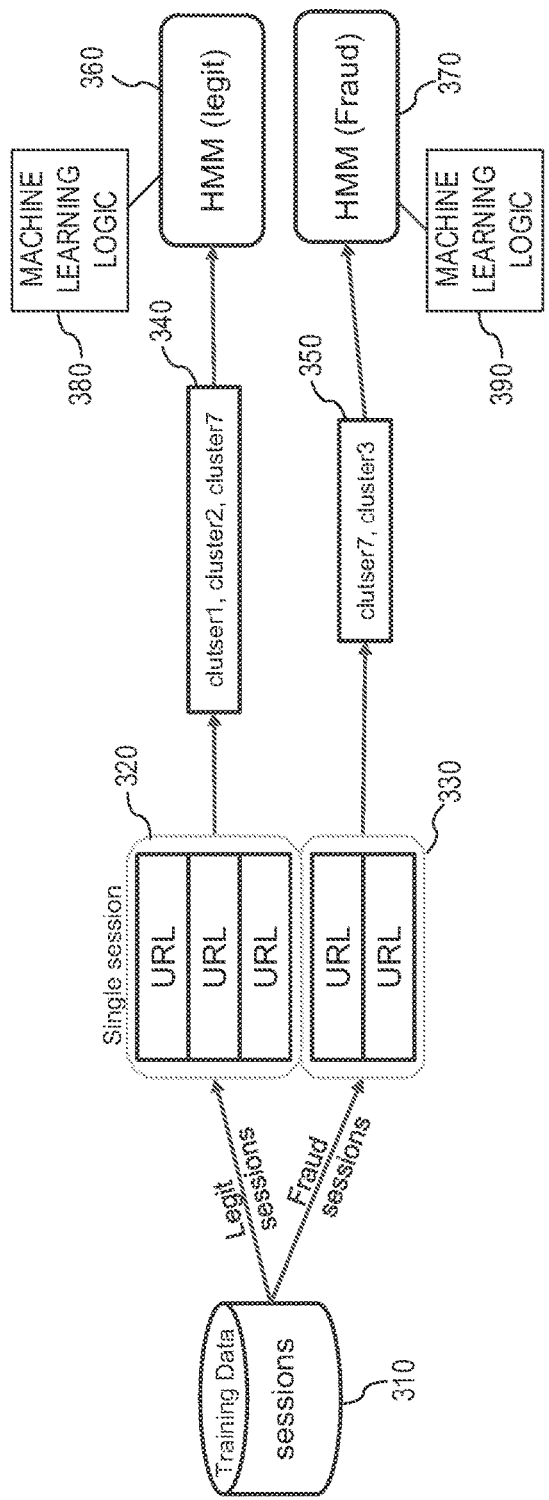
FIG. 3 is an example diagram illustrating a training stage process for training one or more sequential machine learning models to classify user flow data in accordance with one illustrative embodiment.

FIG. 3 is an example diagram illustrating a training stage process for training one or more sequential machine learning models to classify user flow data in accordance with one illustrative embodiment. As shown in FIG. 3, a training data set 310 is provided which may include user flow data for various user sessions with a website, where the user flow data are labeled as legitimate or fraudulent with regard to a particular fraud of interest, e.g., ATO frauds. The training dataset 310 may comprise actual user session data captured during user sessions with a website, may comprise synthetic user session data representing possible interactions with the website, or any combination of actual and synthetic user session data. The user session data includes information, such as the collected user flow data discussed previously, representing the user's interactions and traversing of the website, which may include timestamps for the user experiencing content of a particular URL, and in some cases an amount of time that the user experiences the content of the particular URL before transitioning to another URL or ending the user session.

In one illustrative embodiment, the training dataset 310 may be separated into two training datasets 320, 330 where one training dataset 320 comprises the user session data for legitimate labeled user sessions, and the other training dataset 330 comprises the user session data for fraudulent labeled user sessions. Each of the suer datasets comprise the user flow data for that session which includes, for example, URL data of the type {timestamp, url, time on page}. This user flow data is converted to a cluster ID vector representation 340, 350 using the mechanisms discussed previously. The cluster ID vector representation 340, 350 is input to the corresponding sequential machine learning model, e.g., HMM, 360, 370 to thereby process the cluster ID vector representation 340, 350. The model 360, 370 generates a predicted classification based on the input cluster ID vector representation 340, 350, which is then processed by machine learning training logic 380, 390 along with the labels of the training data to modify the corresponding model 360, 370 to reduce a loss/error in the predicted classification. Once the loss/error generated by the models 360, 370 reaches an acceptable level, e.g., a threshold level of loss/error, then the training may be considered to have converged. Alternatively, if a predetermined number of epochs or iterations of machine learning have occurred, then the models 360, 370 may be considered converged.

Figure 4:
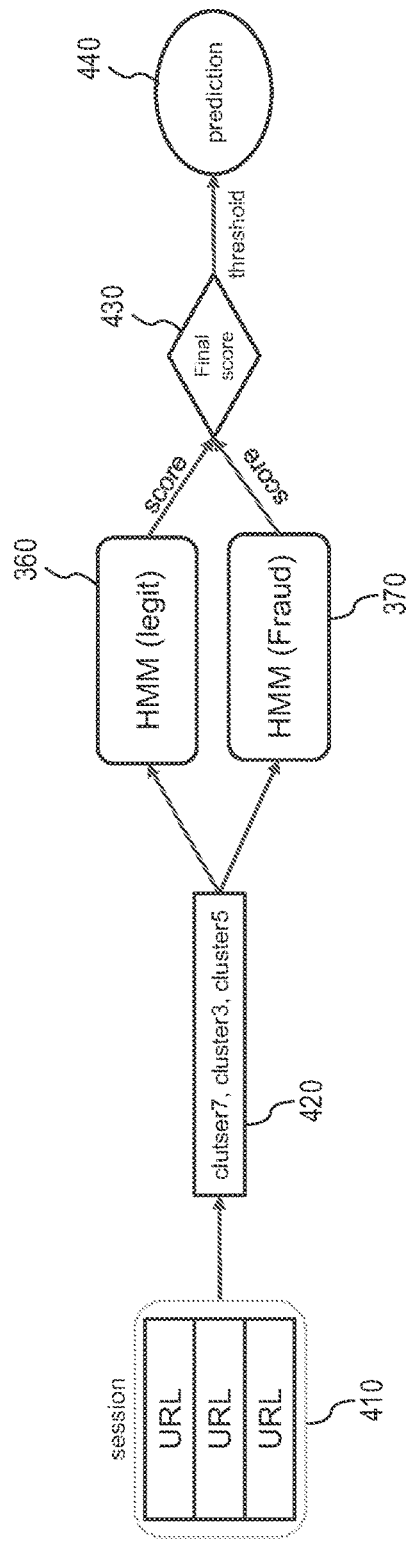
FIG. 4 is an example diagram illustrating a classification stage process for classifying a user flow as to whether it is indicative of a fraud or not in accordance with one illustrative embodiment.

FIG. 4 is an example diagram illustrating a classification stage process for classifying a user flow as to whether it is indicative of a fraud or not in accordance with one illustrative embodiment. The operation of FIG. 4 assumes that the sequential machine learning computer models, e.g., HMMs, 360, 370 have been trained, such as using the process outlined in FIG. 3, for example. As shown in FIG. 4, new user flow data 410 for a user session with the website is received. The user flow data 410 is converted to a cluster ID vector representation in a similar manner as discussed previously, to generate the cluster ID vector representation 420. The cluster ID vector representation 420 is input to both of the HMMs 360, 370 which each generate their own score or probability value. The HMM 360 scores the input cluster ID vector representation 420 with regard to the probability that the cluster ID vector representation 420 represents a legitimate user flow. The HMM 370 scores the input cluster ID vector representation 420 with regard to the probability that the cluster ID vector representation 420 represents a fraudulent user flow. The two scores are then compared to generate a final score 430 and based on the final score 430 a final classification 440 for the user flow represented by the cluster ID vector representation 420 is generated and logged/reported and/or used by downstream computing system processes, such as security processes. For example, the final classification 440 may be used to automatically block or terminate user sessions determined to be fraudulent.

Figure 5:
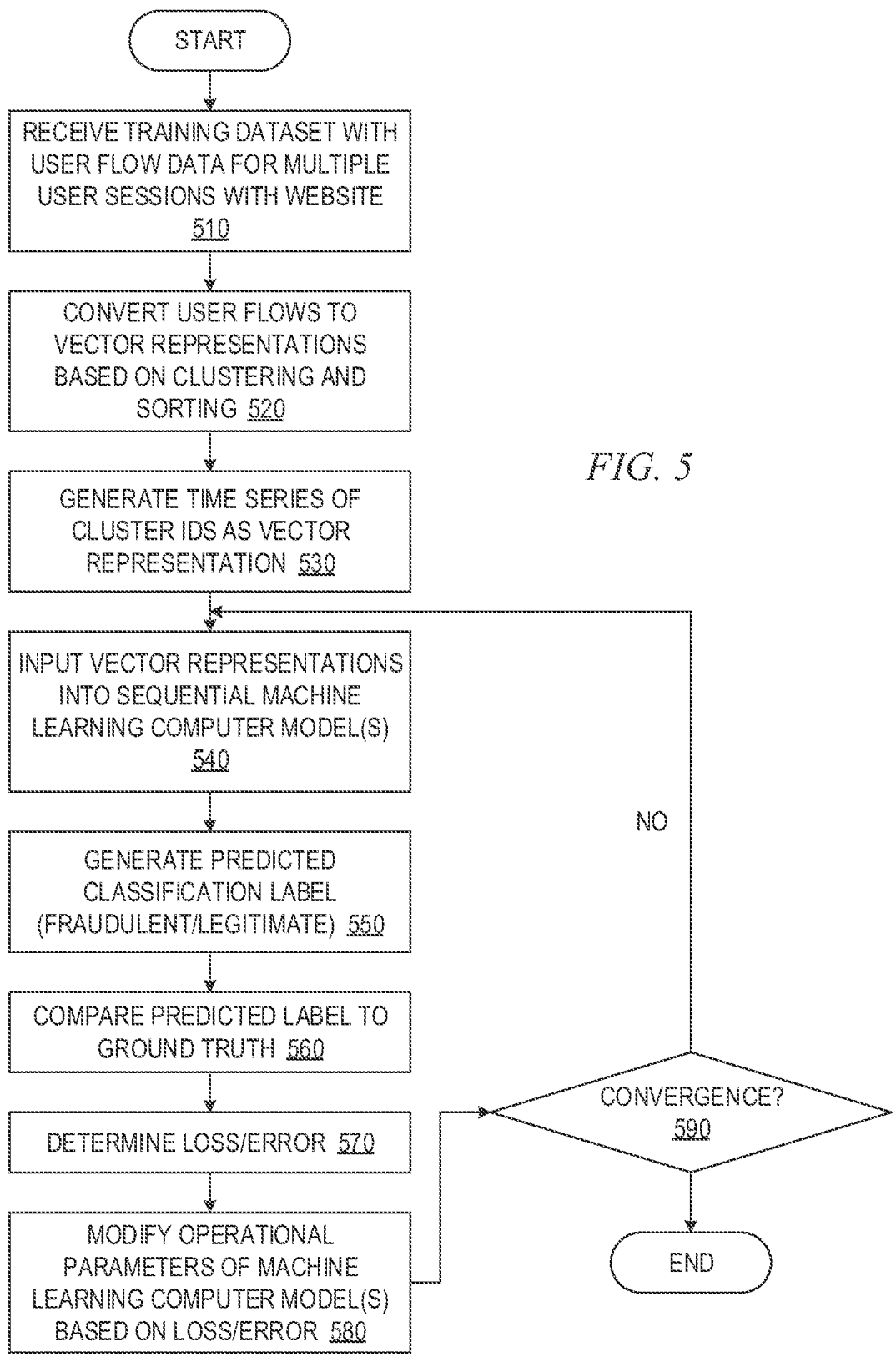
FIG. 5 is a flowchart outlining an example operation for training one or more sequential machine learning models to classify user flow data in accordance with one illustrative embodiment.
Figure 6:
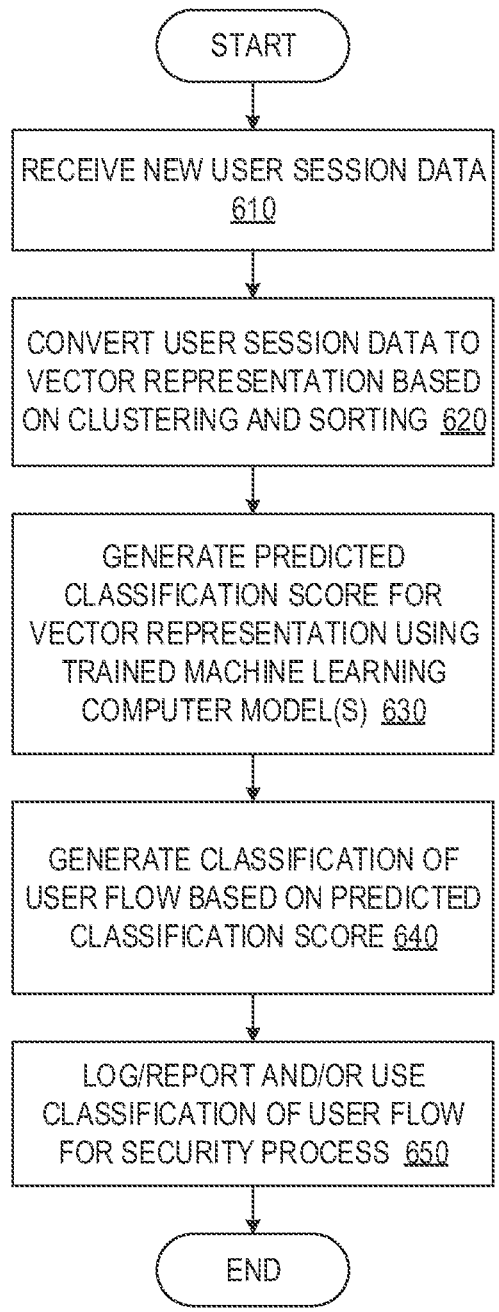
FIG. 6 is a flowchart outlining an example operation for classifying a user flow as fraudulent or legitimate in accordance with one illustrative embodiment.

FIGS. 5-6 present flowcharts outlining example operations of elements of the present invention with regard to one or more illustrative embodiments. It should be appreciated that the operations outlined in FIGS. 5-6 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 5-6, and may, in some cases, make use of the results generated as a consequence of the operations set forth in FIGS. 5-6, the operations in FIGS. 5-6 themselves are specifically performed by the improved computing tool in an automated manner.

FIG. 5 is a flowchart outlining an example operation for training one or more sequential machine learning models to classify user flow data in accordance with one illustrative embodiment. As shown in FIG. 5, a training dataset comprising a plurality of user session data for a plurality of user sessions is received (step 510). Each user session represented in the training dataset comprises a user flow for the user session where the user flow is a set of session data specifying timestamps, URLs, and optionally an amount of time on accessing the content associated with the URLs. The user session data is converted to vector representations by performing clustering and timestamp based sorting (step 520) and generating a time series of cluster identifiers as a vector representation (step 530). The vector representations are the input to a corresponding sequential machine learning computer model (step 540). The sequential machine learning computer model processes the vector representation and generates a predicted classification label as to whether the input vector representation indicates the user flow to be fraudulent or not fraudulent (step 550).

The predicted classification label is compared to the ground truth label of the session data for the session as obtained from the training dataset (step 560). Based on the comparison, a loss or error is determined (step 570) and the loss/error is compared to a threshold loss/error and if the loss/error is equal to or greater than the threshold, then a modification of operational parameters of the sequential machine learning computer model is performed, such as through backpropagation, to thereby reduce the loss/error (step 580). A determination is made as to whether the training of the machine learning model(s) has reached convergence, e.g., the loss/error is less than the threshold or a predetermined number of iterations or epochs have occurred (step 590). If either the loss/error is less than the threshold or a predetermined number of iterations or epochs have occurred, then the model is determined to have been converged and the operation terminates; otherwise, the operation returns to step 540 to continue the training of the machine learning model(s) until convergence is reached.

FIG. 6 is a flowchart outlining an example operation for classifying a user flow as fraudulent or legitimate in accordance with one illustrative embodiment. As shown in FIG. 6, the operation starts by receiving new user session data (step 610). This new user session data may be data collected over time during the user session and may be collected dynamically as the user session is occurring or may be received after the user session is concluded. For example, the user session data may be collected and periodically transmitted to the mechanisms of the illustrative embodiments during the user session for classification.

The user session data is converted to a vector representation based on a clustering and sorting based on timestamps, similar to steps 520 and 530 in FIG. 5 (step 620). The vector representation is input to at least one already trained sequential machine learning computer model which processes the vector representation and generates a predicted classification score (step 630). Based on the predicted classification score, a classification of the user flow in the user session data is generated (step 640) and is logged/reported and/or used to automatically implement security processes (step 650). The operation then terminates.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for detecting fraudulent user flows associated with a website, the method comprising:
    receiving user flow data representing an interaction by a user with content of a website;
    converting the user flow data to a vector representation, wherein the vector representation represents a time series transition from one portion of website content to another of the website;
    inputting the vector representation to at least one trained sequential machine learning computer model which processes the vector representation and generates a classification of the vector representation;
    detecting whether or not the user flow data represents a fraudulent user flow based on the classification; and
    outputting an output that indicates whether or not the user flow is a fraudulent user flow based on the detection,
    wherein converting the user flow data to a vector representation comprises:
        sorting entries in the user flow data according to timestamp associated with the entries;
        clustering the entries into a plurality of clusters based on a cluster mapping of identifiers of corresponding content of the website associated with the entries, wherein each cluster in the plurality of clusters has a corresponding cluster identifier; and
        generating the vector representation as a vector of cluster identifiers arranged in time series order according to results of the sorting.

2. The method of claim 1, wherein the user flow data comprises one or more entries, wherein each entry comprises a timestamp and a corresponding identifier of corresponding content of the website, wherein the timestamp specifies a time when a user accesses the corresponding content of the website.

3. The method of claim 2, wherein the corresponding content of the website is a webpage of the website, and wherein the corresponding identifier is a Uniform Resource Locator (URL) of the corresponding content of the website.

4. The method of claim 1, wherein the clustering of the entries comprises clustering uniform resource locator (URL) fragments into the clusters, and wherein the vector representation comprises a sequential time series of cluster identifiers corresponding to the user flow data.

5. The method of claim 1, wherein the at least one trained sequential machine learning computer model comprises a sequential machine learning computer model that is trained to classify the vector representation as to whether or not the vector representation represents a user flow that is indicative of a fraud being committed by a fraudulent user flow.

6. The method of claim 5, wherein the fraud is an Account Takeover (ATO) fraud.

7. The method of claim 1, wherein the at least one trained sequential machine learning computer model comprises at least one Hidden Markov Model (HMM) computer model and wherein the vector representation is a Markov chain.

8. The method of claim 1, wherein the at least one trained sequential machine learning computer model comprises a first sequential machine learning computer model trained to classify the vector representation as to whether or not the vector representation represents a user flow that is indicative of a fraud being committed by a fraudulent user flow, and a second sequential machine learning computer model trained to classify the vector representation as to whether or not the vector representation represents a user flow that is indicative of a legitimate user flow.

9. The method of claim 8, wherein the first sequential machine learning computer model generates a first score and the second sequential machine learning computer model generates a second score, and wherein detecting whether or not the user flow data represents a fraudulent user flow based on the classification comprises comparing the first score relative to the second score and based on results of the comparison, detecting whether the user flow data represents a fraudulent user flow.

10. A computer program product comprising a computer readable storage medium having a computer readable program stored therein, wherein the computer readable program, when executed on a data processing system, causes the data processing system to:
receive user flow data representing an interaction by a user with content of a website;
convert the user flow data to a vector representation, wherein the vector representation represents a time series transition from one portion of website content to another of the website;
input the vector representation to at least one trained sequential machine learning computer model which processes the vector representation and generates a classification of the vector representation;
detect whether or not the user flow data represents a fraudulent user flow based on the classification; and
output an output that indicates whether or not the user flow is a fraudulent user flow based on the detection,
wherein converting the user flow data to a vector representation comprises:
sorting entries in the user flow data according to timestamp associated with the entries;
clustering the entries into a plurality of clusters based on a cluster mapping of identifiers of corresponding content of the website associated with the entries, wherein each cluster in the plurality of clusters has a corresponding cluster identifier; and
generating the vector representation as a vector of cluster identifiers arranged in time series order according to results of the sorting.

11. The computer program product of claim 10, wherein the user flow data comprises one or more entries, wherein each entry comprises a timestamp and a corresponding identifier of corresponding content of the website, wherein the timestamp specifies a time when a user accesses the corresponding content of the website.

12. The computer program product of claim 10, wherein the clustering of the entries comprises clustering uniform resource locator (URL) fragments into the clusters, and wherein the vector representation comprises a sequential time series of cluster identifiers corresponding to the user flow data.

13. The computer program product of claim 10, wherein the at least one trained sequential machine learning computer model comprises a sequential machine learning computer model that is trained to classify the vector representation as to whether or not the vector representation represents a user flow that is indicative of a fraud being committed by a fraudulent user flow.

14. The computer program product of claim 13, wherein the fraud is an Account Takeover (ATO) fraud.

15. The computer program product of claim 10, wherein the at least one trained sequential machine learning computer model comprises at least one Hidden Markov Model (HMM) computer model and wherein the vector representation is a Markov chain.

16. The computer program product of claim 10, wherein the at least one trained sequential machine learning computer model comprises a first sequential machine learning computer model trained to classify the vector representation as to whether or not the vector representation represents a user flow that is indicative of a fraud being committed by a fraudulent user flow, and a second sequential machine learning computer model trained to classify the vector representation as to whether or not the vector representation represents a user flow that is indicative of a legitimate user flow.

17. The computer program product of claim 16, wherein the first sequential machine learning computer model generates a first score and the second sequential machine learning computer model generates a second score, and wherein detecting whether or not the user flow data represents a fraudulent user flow based on the classification comprises comparing the first score relative to the second score and based on results of the comparison, detecting whether the user flow data represents a fraudulent user flow.

18. An apparatus comprising:
at least one processor; and
at least one memory coupled to the at least one processor, wherein the at least one memory comprises instructions which, when executed by the at least one processor, cause the at least one processor to:
receive user flow data representing an interaction by a user with content of a website;
convert the user flow data to a vector representation, wherein the vector representation represents a time series transition from one portion of website content to another of the website;
input the vector representation to at least one trained sequential machine learning computer model which processes the vector representation and generates a classification of the vector representation;
detect whether or not the user flow data represents a fraudulent user flow based on the classification; and
output an output that indicates whether or not the user flow is a fraudulent user flow based on the detection,
wherein converting the user flow data to a vector representation comprises:
sorting entries in the user flow data according to timestamp associated with the entries;
clustering the entries into a plurality of clusters based on a cluster mapping of identifiers of corresponding content of the website associated with the entries, wherein each cluster in the plurality of clusters has a corresponding cluster identifier; and
generating the vector representation as a vector of cluster identifiers arranged in time series order according to results of the sorting.

* * * * *